(12) United States Patent
Burda et al.

(10) Patent No.: US 8,452,437 B2
(45) Date of Patent: May 28, 2013

(54) PRODUCT RELEASE CONTROL INTO TIME-SENSITIVE PROCESSING ENVIRONMENTS

(75) Inventors: Richard G. Burda, Pleasant Valley, NY (US); John T. Federico, Wappingers Falls, NY (US); Oliver Liao, Charlottesville, VA (US); Thomas D. Stahlecker, Pleasantville, NY (US); Jonathan Levy, Hopewell Junction, NY (US); Benjamin Wheeler, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 12/615,351

(22) Filed: Nov. 10, 2009

(65) Prior Publication Data
US 2011/0112675 A1  May 12, 2011

(51) Int. Cl.
G06F 7/00  (2006.01)
(52) U.S. Cl.
USPC ............................ 700/101; 700/100; 700/103
(58) Field of Classification Search
USPC .................................................. 700/100, 101
See application file for complete search history.

(56) References Cited

U.S. PATENT DOCUMENTS

| | | | |
|---|---|---|---|
| 5,444,632 A * | 8/1995 | Kline et al. | 700/100 |
| 5,612,886 A * | 3/1997 | Weng | 700/101 |
| 6,647,307 B1 | 11/2003 | Huang et al. | |
| 6,816,746 B2 * | 11/2004 | Bickley et al. | 700/99 |
| 7,020,594 B1 | 3/2006 | Chacon | |
| 7,151,972 B2 * | 12/2006 | Denton et al. | 700/99 |
| 7,174,232 B2 | 2/2007 | Chua et al. | |
| 7,257,454 B2 * | 8/2007 | Chien | 700/101 |
| 7,337,032 B1 | 2/2008 | Nettles et al. | |
| 7,463,939 B1 | 12/2008 | Mata et al. | |
| 7,477,958 B2 | 1/2009 | Burda et al. | |
| 7,610,111 B2 * | 10/2009 | Lin et al. | 700/101 |
| 7,908,127 B2 * | 3/2011 | Weigang et al. | 703/6 |
| 2005/0154625 A1 * | 7/2005 | Chua et al. | 705/7 |
| 2009/0037012 A1 * | 2/2009 | Weigang et al. | 700/101 |

\* cited by examiner

*Primary Examiner* — Jeffrey A Gaffin
*Assistant Examiner* — Michael Scapin
(74) *Attorney, Agent, or Firm* — Gibb & Riley, LLC

(57) ABSTRACT

A method identifies time sensitive processing sequences within a production environment using a computerized device. The processing sequences perform operations utilizing one or more tools. The method also identifies non-committed work in process items that are grouped in non-committed lots for release into one or more of the time sensitive processing sequences, and identifies committed work in process items that are being processed in committed lots within the time sensitive processing sequences, using the computerized device. The method sorts the non-committed lots by a predetermined priority, again using the computerized device. Starting with the highest priority non-committed lot (and continuing with others of the non-committed lots in priority order) the method determines whether there is available tool capacity to process a non-committed lot through each corresponding time sensitive processing sequence using the computerized device. If the tool capacity is available for the non-committed lot, the method releases the non-committed lot to begin the corresponding time sensitive processing sequences, using the computerized device.

20 Claims, 9 Drawing Sheets

PRODUCT RELEASE CONTROL INTO TIME-SENSITIVE PROCESSING ENVIRONMENTS

BACKGROUND

The present invention relates to controlling work in process flows through a production environment, and more specifically, to a method that determines whether there is available tool capacity to process a non-committed lot through each required time sensitive processing sequence before releasing that lot to the processing sequence.

One aspect of managing production environments relates to controlling the release of work in process (WIP) into process time windows for factories with a diverse product mix and shared resources. A process time window (PTW) is a manufacturing process requirement where two or more operations must be completed within a period of specified length. Process time window violations can cause product rework or scrap. Shared resources are manufacturing equipment (tools) that are used to process multiple product types.

An issue associated with work in process that is subject to process time window constraints is that tools within process windows are often shared by many product flows, some with time constraints, some without. Further, some tools are not reliably available, and all tools have variability in availability. In addition, the production priority scheme for the products produced by the production environment must be maintained. Some product flows are very long and complex (e.g., over 500 process steps and over 4 weeks of processing time) and some fabrication product flows have from a handful up to 30 process time windows. Also, the trend is for newer product flows have more process time windows.

Therefore, controlled release of WIP is necessary to properly manage process time windows. In some manufacturing environments, production tools must process a mix of time constrained and non-time constrained WIP. This presents two problems for those dispatching WIP to such tools. First, it is difficult to identify time sensitive/non-time sensitive WIP in the queue for the machine/equipment starting the process time window. Secondly, while there are methods for deciding how much time sensitive WIP can be processed, it is still difficult to know how to prioritize and dispatch a mix of time sensitive and non-time sensitive WIP for optimal tool utilization and to meet supply chain objectives.

SUMMARY

One embodiment of the present invention is a method that identifies time sensitive processing sequences within a production environment using a computerized device. The processing sequences perform operations utilizing one or more tools. The method also identifies non-committed work in process items that are grouped in non-committed lots for release into one or more of the time sensitive processing sequences, and identifies committed work in process items that are being processed in committed lots within the time sensitive processing sequences, using the computerized device. The method sorts the non-committed lots by a predetermined priority, again using the computerized device. Starting with the highest priority non-committed lot (and continuing with others of the non-committed lots in priority order) the method determines whether there is available tool capacity to process a non-committed lot through each corresponding time sensitive processing sequence using the computerized device. If the tool capacity is available for the non-committed lot, the method releases the non-committed lot to begin the corresponding time sensitive processing sequences, using the computerized device.

Another embodiment of the present invention is a method that identifies time sensitive processing sequences within a production environment using a computerized device. The processing sequences perform operations utilizing one or more tools. The method also identifies non-committed work in process items that are grouped in non-committed lots for release into one or more of the time sensitive processing sequences, identifies committed work in process items that are being processed in committed lots within the time sensitive processing sequences, identifies committed remaining operations for committed lots, and identifies non-committed remaining operations for non-committed lots, all using the computerized device. The method sorts the non-committed lots by a predetermined priority, again using the computerized device. Starting with the highest priority non-committed lot (and continuing with others of the non-committed lots in priority order) the method determines whether there is available tool capacity to process a non-committed lot through each corresponding time sensitive processing sequence based on the committed remaining operations and the non-committed remaining operations, all using the computerized device. If the tool capacity is available for the non-committed lot, the method releases the non-committed lot to begin the corresponding time sensitive processing sequences, using the computerized device.

A further embodiment of the present invention is a method that identifies time sensitive processing sequences within a production environment using a computerized device. The processing sequences perform operations utilizing one or more tools. The method also identifies non-committed work in process items that are grouped in non-committed lots for release into one or more of the time sensitive processing sequences, identifies committed work in process items that are being processed in committed lots within the time sensitive processing sequences, identifies committed remaining operations for committed lots, identifies non-committed remaining operations for non-committed lots, and identifies availability of the tools within the committed remaining operations, all using the computerized device. After the identification operations, the method determines tools that will be utilized for the non-committed remaining operations, using the computerized device. The method sorts the non-committed lots by a predetermined priority, again using the computerized device. Starting with the highest priority non-committed lot (and continuing with others of the non-committed lots in priority order) the method determines whether there is available tool capacity to process a non-committed lot through each corresponding time sensitive processing sequence based on the availability of the tools within the committed remaining operations and the tools that will be utilized for the non-committed remaining operations, all using the computerized device. If the tool capacity is available for the non-committed lot, the method releases the non-committed lot to begin the corresponding time sensitive processing sequences, using the computerized device.

An additional embodiment comprises a computer program product comprising a computer readable storage medium having computer readable program code embodied therewith. The computer readable program code is configured to perform a method that identifies time sensitive processing sequences within a production environment using a computerized device. The processing sequences perform operations utilizing one or more tools. The method also identifies non-committed work in process items that are grouped in non-committed lots for release into one or more of the time sensitive processing sequences, and identifies committed work in process items that are being processed in committed lots within the time sensitive processing sequences, using the computerized device. The method sorts the non-committed lots by a predetermined priority, again using the computerized device. Starting with the highest priority non-committed lot (and continuing with others of the non-committed lots in priority order) the method determines whether there is available tool capacity to process a non-committed lot through each corresponding time sensitive processing sequence using the computerized device. If the tool capacity is available for the non-committed lot, the method releases the non-committed lot to begin the corresponding time sensitive processing sequences, using the computerized device.

DETAILED DESCRIPTION

Figure 1:
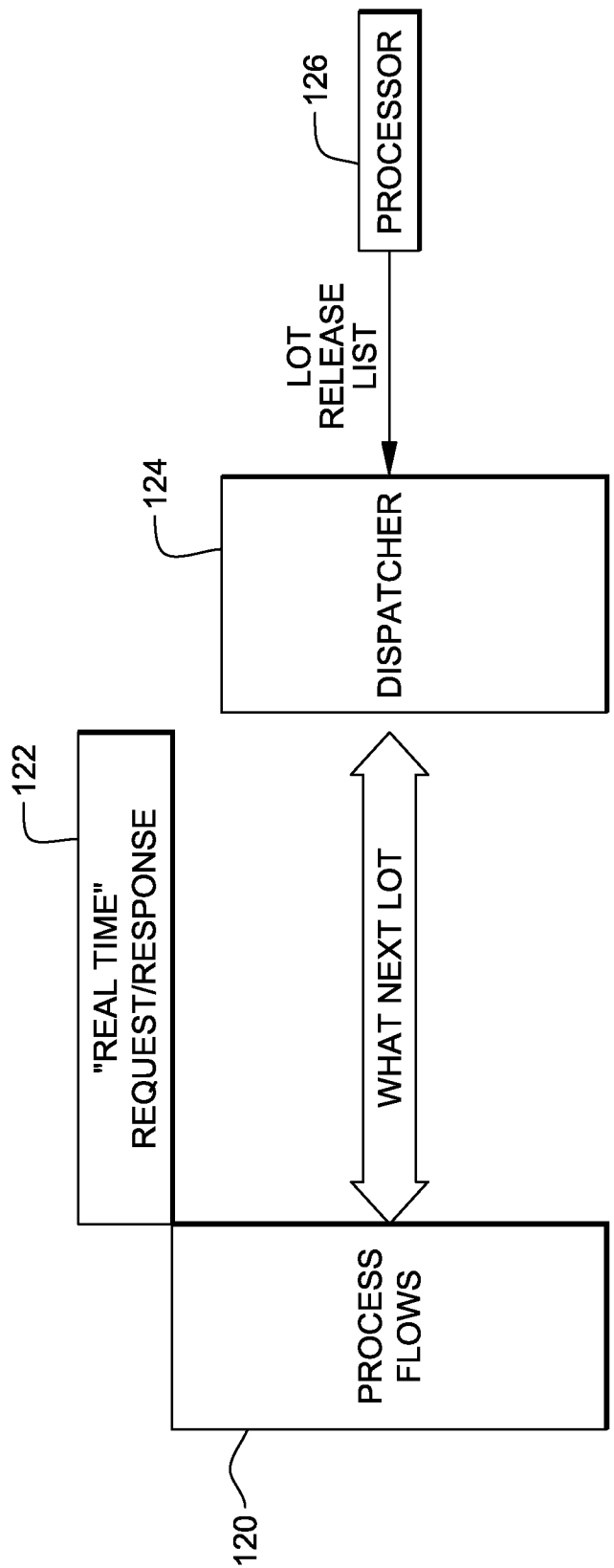
FIG. 1 is a schematic diagram that illustrates a system utilized by embodiments herein.

FIG. 1 is a schematic diagram that illustrates a production environment. Item 130 represents various resources and tools that are utilized within processing activity flows. The tools and resources within item 120 transform raw materials into intermediate and final products. The processor 126 performs the methods described below to direct a dispatcher 124 to perform the processing flows in item 120. The processor 126 provides lot priorities to the dispatcher 124. This allows the dispatcher 124 to provide real time requests and responses 122. These requests and responses can identify which lot is next, which process is next.

Within such a production environment, certain processing activity flows that are applied to lots of work in process items must be completed within a certain processing time window or the work in process items may be destroyed or have a very low yield. Therefore, once a processing flow that has a processing time window limitation is begun, it must be completed within the time limit of the processing flow. For example, if one of the processing activities within a processing flow uses a tool to deposit a material that is easily oxidized, it may be necessary to cover the material was some form of insulator within the processing time window to prevent the material from oxidizing excessively. Thus, in this example, if the material is not covered with the insulator within the processing time window, the entire lot may suffer excessive oxidation and have to be scrapped.

One way to deal with process time windows is to manage each process time window independently by applying work in process caps for each processing flow. This method holds work in process prior to starting a processing flow until the work in process currently within the processing flow is below the cap or limit. However, this method ignores the fact that some of the tools or resources within the processing flow are shared with other processing flows which creates the risk of releasing too much or too little work and processing to the processing flow. In addition, with this method, work in process limits are based on the "planned" bottleneck operation, which risks releasing too much work in process and to the processing flow when non-bottleneck tools are underperforming. Further, with this type of method, when new processing flows are established, it is necessary to setup bottleneck definitions and work in process limits.

Such simplified work in process management methods may be acceptable for production environments that always produce the same product where work in process limits and bottlenecks have been established over long histories and are very well-known. However, simplified methods are not as effective in production environments that constantly change the product being manufactured and that perform many diverse processing flows simultaneously.

The problem of maintaining balance between time constrained and non-time constrained WIP is unique to manufacturing environments with tools running a large quantity of different part numbers in lower volumes as opposed to an environment with tools running only a few different part numbers in high volumes. Without balancing, time constrained WIP is pushed through the factory at an accelerated rate at the expense of non-time constrained WIP, which may be delayed.

Such product diversity requires more short term tool group capacity knowledge and the ability to pre-reserve tools. Therefore, various embodiments herein dispose global processing time windows in queues through the use of priority capacity/demand parameters for the tools within the processing flows. The embodiments herein provide a process to create a report that lists the routes and operations that require queue time control. Reports are updated using a method with adjustable parameters for the time-constrained processes that will output when specific time-constrained lots should be released. The embodiments herein contain a balancing factor to ensure that an optimal mix of time constrained and non-time constrained lots are dispatched.

Thus, with embodiments herein, global processing time window entry is control by setting priority capacity (PCAP) for all tools, calculating the current priority demand (PDEM) for all tools based on current processing time window work in process and their downstream operations, creating a global processing time window queue and evaluating each lot in priority order. The embodiments herein release lots when committed priority demand plus the required priority demand is less than priority capacity for each operation in the processing flow. Further, the commitment priority demand is recalculated for each lot released before evaluating the next lot.

Figure 2:
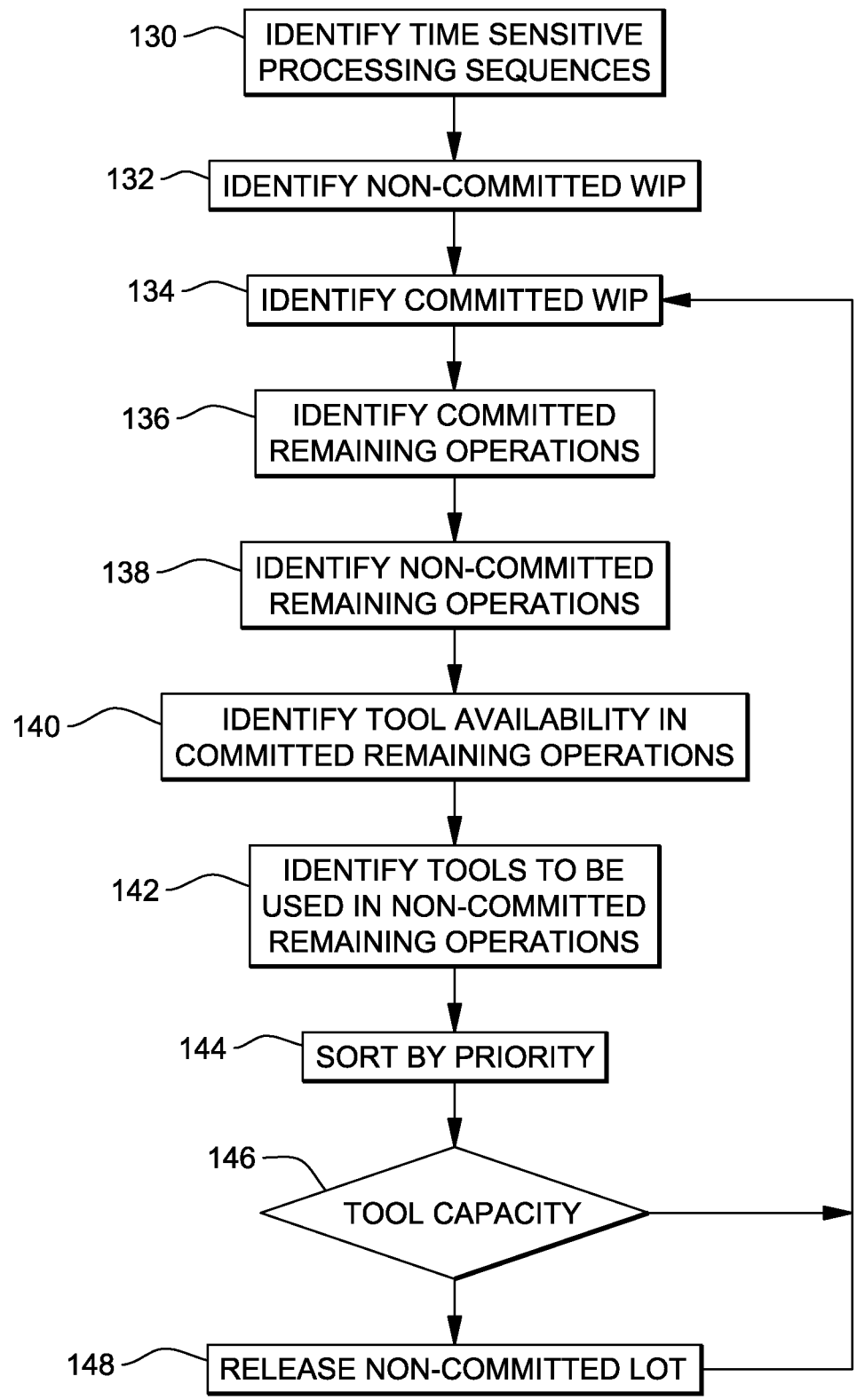
FIG. 2 is a flowchart illustrating embodiments herein.

More specifically, as shown in flowchart form in FIG. 2, the embodiments herein identify time sensitive processing sequences within a production environment 130. All steps within the flowcharts shown herein are automated and can be executed by a computerized device, such as the dispatcher 124 discussed above, or the device discussed below and illustrated in FIG. 5. As mentioned above, the processing sequences perform operations utilizing one or more tools. Further, some of the processing sequences can be subject to time constraints, while other processing sequences may not.

Various lots of work in process items many already have been released into one of many processing sequences and are therefore considered "committed" work in process items. Other lots maybe in a queue waiting to be released into a processing sequence and are referred to as "non-committed" work in process items. The method identifies such non-committed work in process items that are grouped in non-committed lots for release into the one or more of the time sensitive processing sequences in item 132 and identifies such committed work in process items that are being processed in committed lots within the time sensitive processing sequences in item 134.

Those lots that are committed and are within a certain processing flow will have a certain number of processing activities that remain to be completed. Therefore, the method identifies such committed remaining operations for committed lots in item 136. The processor also identifies non-committed remaining operations for non-committed lots in item 138. Such non-committed remaining operations are all those operations that are included within a processing flow that a non-committed lot is waiting to be released into. In item 140, the method identifies the availability of the tools within the committed remaining operations. The method also determines which tools will be utilized for the non-committed remaining operations once a lot is released into one of the processing flows, in item 142.

The method sorts the non-committed lots by a predetermined priority in item 144. For example, priorities are commonly established within manufacturing environments to favor one device over on other device. Therefore, if the tool is available it is generally awarded to a higher priority item for processing to allow the favored device to be produced more quickly than the lower priority devices.

Then, in item 146, starting with the highest priority non-committed lot (and continuing with others of the non-committed lots in priority order) the method determines whether there is available tool capacity to process a non-committed lot through each corresponding time sensitive processing sequence based on the availability of the tools within the committed remaining operations and the tools that will be utilized for the non-committed remaining operations. The process of determining whether there is available tool capacity 146 is performed one lot at a time. Therefore, in item 146, the then current highest priority non-committed lot is evaluated to determine whether there is (or will be) a resource or tool available to perform each of the time sensitive processing sequences for that lot.

If such tool capacity is available for the non-committed lot (item 146) the method releases the non-committed lot to begin the corresponding time sensitive processing sequences, in item 418. Otherwise processing returns to item 134, flows down to item 146, and the next highest priority non-committed lot is evaluated to determine whether there is (or will be) a resource or tool available to perform each of the time sensitive processing sequences required for that lot.

The releasing of the non-committed lot to begin the corresponding time sensitive processing sequences 148 comprises a fully automated process that does not require human input. Further, the releasing of the non-committed lot 148 comprises a process that physically transforms the non-committed work in process items within the non-committed lots.

Then, as shown by the return arrow from item 148 to item 134, the method repeats the identifying of the non-committed remaining operations for the non-committed lots after releasing the non-committed lot to begin the corresponding time sensitive processing sequences.

Figure 3:
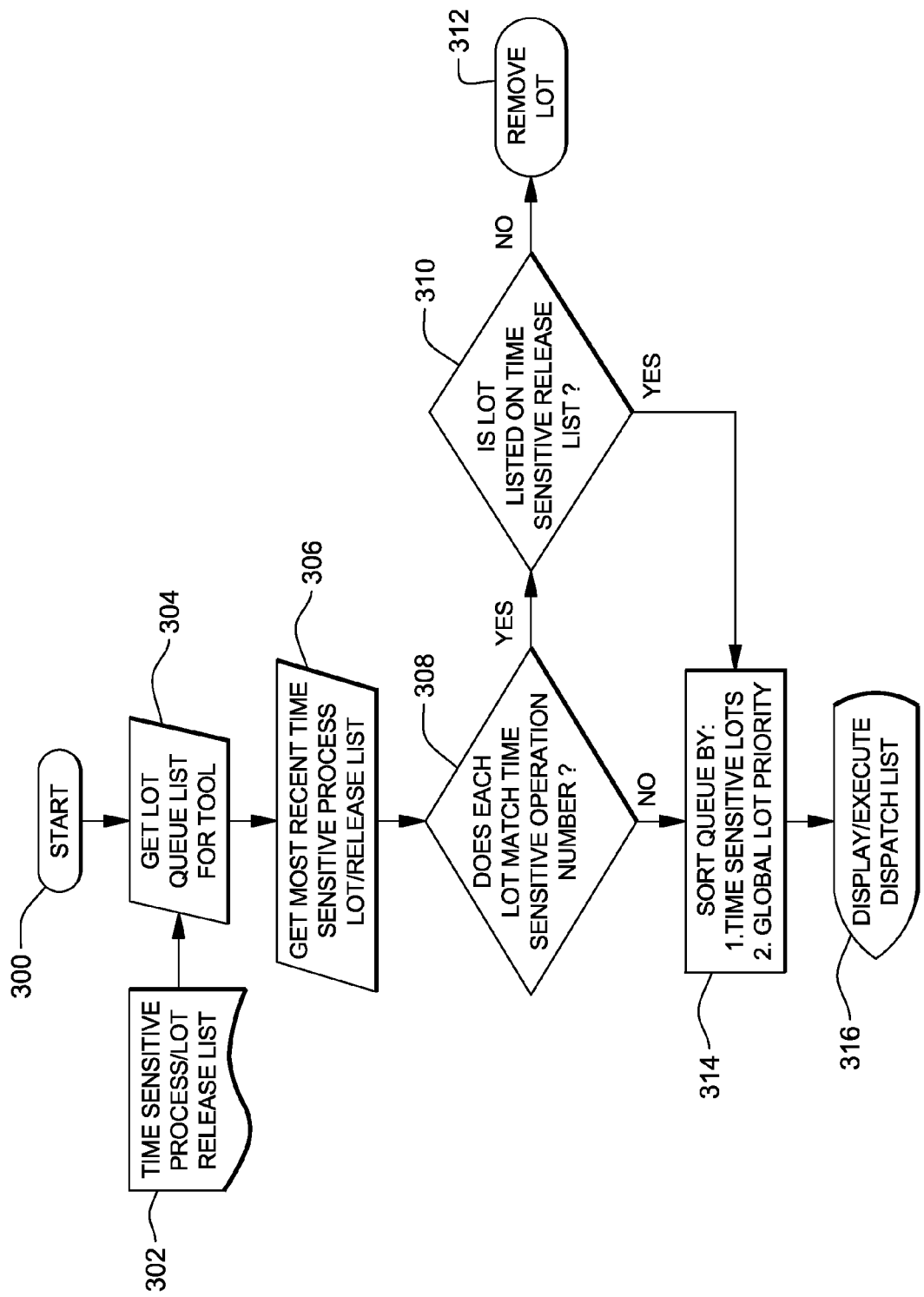
FIG. 3 is a flowchart illustrating embodiments herein.

While FIG. 2 illustrates a generalized conceptual overview of embodiments herein, FIG. 3 illustrates a more specific process used to evaluate the non-committed lots. More specifically, the processing in FIG. 3 begins in item 300. In item 304, the process has the lot queue list for a given tool (from item 302) and, in item 306, this list is updated to the most recent list. In item 308, the process checks to see whether each lot matches with the time sensitive operation number. In other words item 308 checks to see whether the process flow is a time sensitive process flow.

If the process flow is time sensitive, as determined by item 308, in item 310 the method checks to see whether the lot has been committed to be released into the time sensitive process flow. If it has not, the lot is removed from consideration in item 312. This lot will be reevaluated later when more resources are available. If a lot has been committed to be released into the time sensitive flow, as determined by item 310, processing proceeds to item 314 where the lots are sorted according to their time sensitivity and their global lot priority (as discussed above). Then, in item 316, the sorted list of lots can be displayed and the dispatch a list can be executed.

Figure 4:
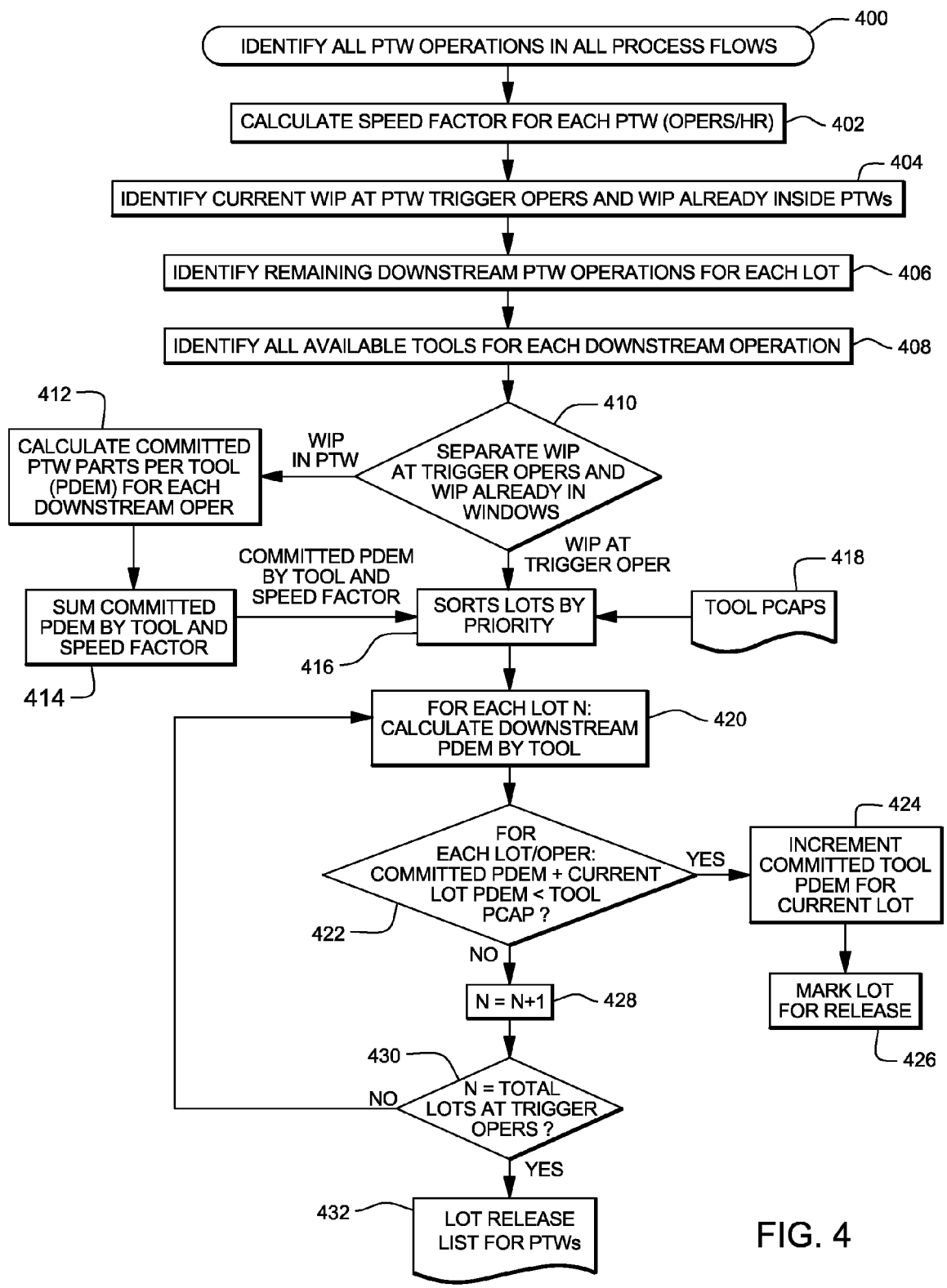
FIG. 4 is a flowchart illustrating embodiments herein.

FIG. 4 illustrates an even more specific process that various embodiments herein can utilize. In FIG. 4, the following abbreviations are utilized: Process Time Window (PTW); Priority WIP Capacity (PCAP); Priority WIP Demand (PDEM); and Trigger Oper (PTW entry control point).

The processing in FIG. 4 begins with items 400-408, which gather various pieces of information. In item 400 all process time window operations in all process flows are identified. In item 402, the speed factor for each process time window (in operations per hour) is calculated. In item 404, the method identifies the current work in process that is waiting at process time window trigger operation points. In other words, item 404 identifies which work in process lots that are available to begin time sensitive processing flows. Item 404 also identifies the amount of work in process that is already being processed within the process time windows. In item 406, the method identifies the remaining downstream processing time window operations for each lot (committed and non-committed). The committed work in process lots may only have a few remaining operations; however, the non-committed lots should have all downstream processing time window operations remaining in item 406. In item 408, the method identifies all the available tools that are needed, or will be needed for each of the downstream operations that are identified in item 406.

After gathering such information, in item 410, the method separates the work in process that is at the trigger operation points (non-committed lots waiting to enter a process time window) from the work in process that is already within the process time windows (committed lots). For non-committed lots, processing proceeds directly to item 416.

For the committed lots where the work in process is already within a process time window, item 412 calculates the process time window parts per tool (PDEM) that are committed for each downstream operation. In item 414, the method sums the committed PDEM by tool and speed factor. This summing process (item 414) allows the embodiments herein to know how many resources and tools the committed work in process items will consume before all their processing flows are completed. In item 416, the method sorts the lots by a priority (as discussed above) based upon the tool priority work in process capacity from item 418.

In item 420, the method calculates the downstream priority work in process demand by a tool, for each a lot. In item 422, the process determines whether (for each lot and operation) the committed priority work in process priority demand plus the current lot priority work in process demand is less than that of the tool priority work in process capacity. In other words, in item 422, the method looks to see whether the work in process currently within processing flows and the committed work in process are still less than the capacity of the tools to handle such items, to determine whether there is sufficient capacity to release additional lots into the processing.

If there is not sufficient resource and tool capacity, processing proceeds to item 428. If there is sufficient capacity, as determined by item 422, in item 424 the method increments the committed tool priority work in process demand for the current lot, and marks the current lot for release in item 426.

In item 428, the lot number is incremented by one to allow the next lot to be analyzed. In item 430, the method checks to see whether the current lot number (N) equals the number of total lots that were at the trigger operation points. If so, processing is complete and the properly marked lots are released into the process time windows in item 432. If not, the method returns to item 420 to process the next lot.

The embodiments herein account for all sharing of tools in all processing flows and consider all tools in each processing flow (not just the planned bottlenecks). Further, with embodiments herein, the priority capacity parameter can "reserve" capacity for non-processing time window lots and the priority capacity can be allocated to processing time window lots in priority order. The processing capacity can also be segregated by processing time window speed requirements. Once processing capacities are in place for all tools, no additional setup is required as new processing time windows are added to existing processing flows.

Further, with embodiments herein, there is a reduced risk of queue-time violations, reduced manual monitoring/intervention, more efficient utilization of tools, more flexibility with variability in lot size, run paths, and queue-time length, and improved balancing of process time constraints and factory delivery commitments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
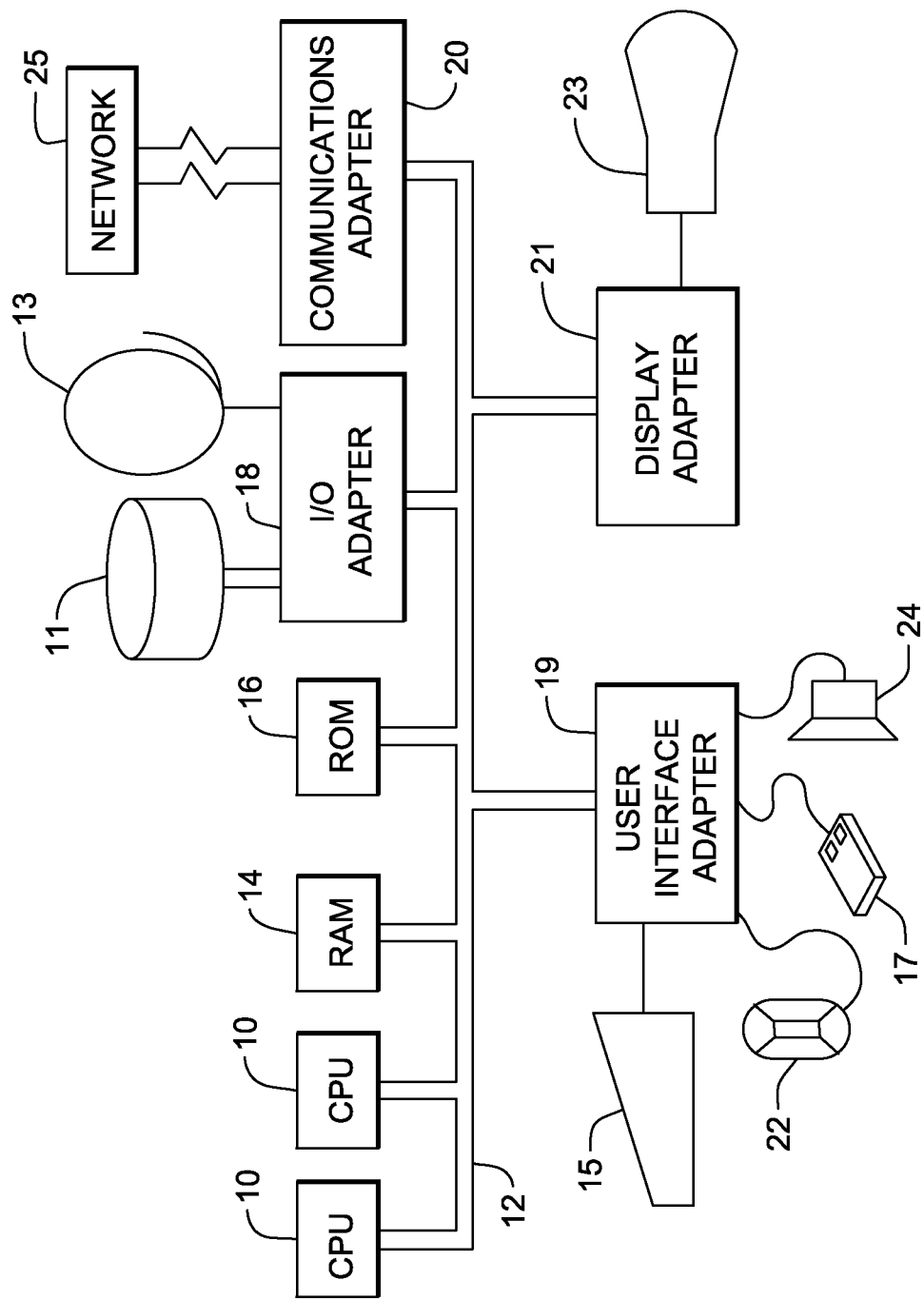
FIG. 5 is a schematic diagram of a system utilized by embodiments herein.

A representative hardware environment for practicing the embodiments of the invention is depicted in FIG. 5. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment Types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. The process software is sent directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 6:
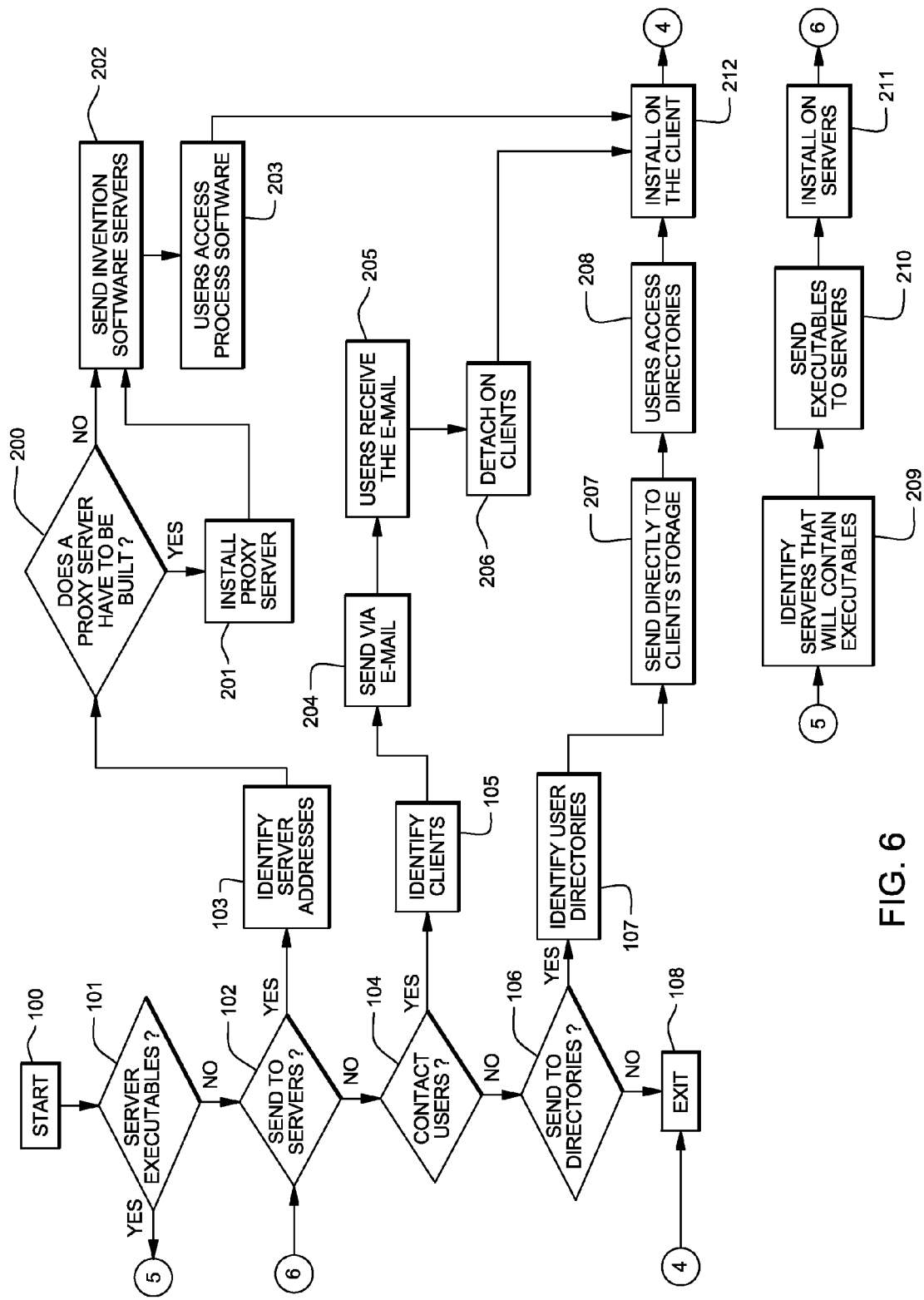
FIG. 6 is a flow diagram of methods for deployment.

FIG. 6 refers to methods for deployment drawings. In Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104, a determination is made whether the process software is to be deployed by sending the process software to users via e-mail. The set of users where the process software will be deployed are identified together with the addresses of the user client computers 105. The process software is sent via e-mail to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software can be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7:
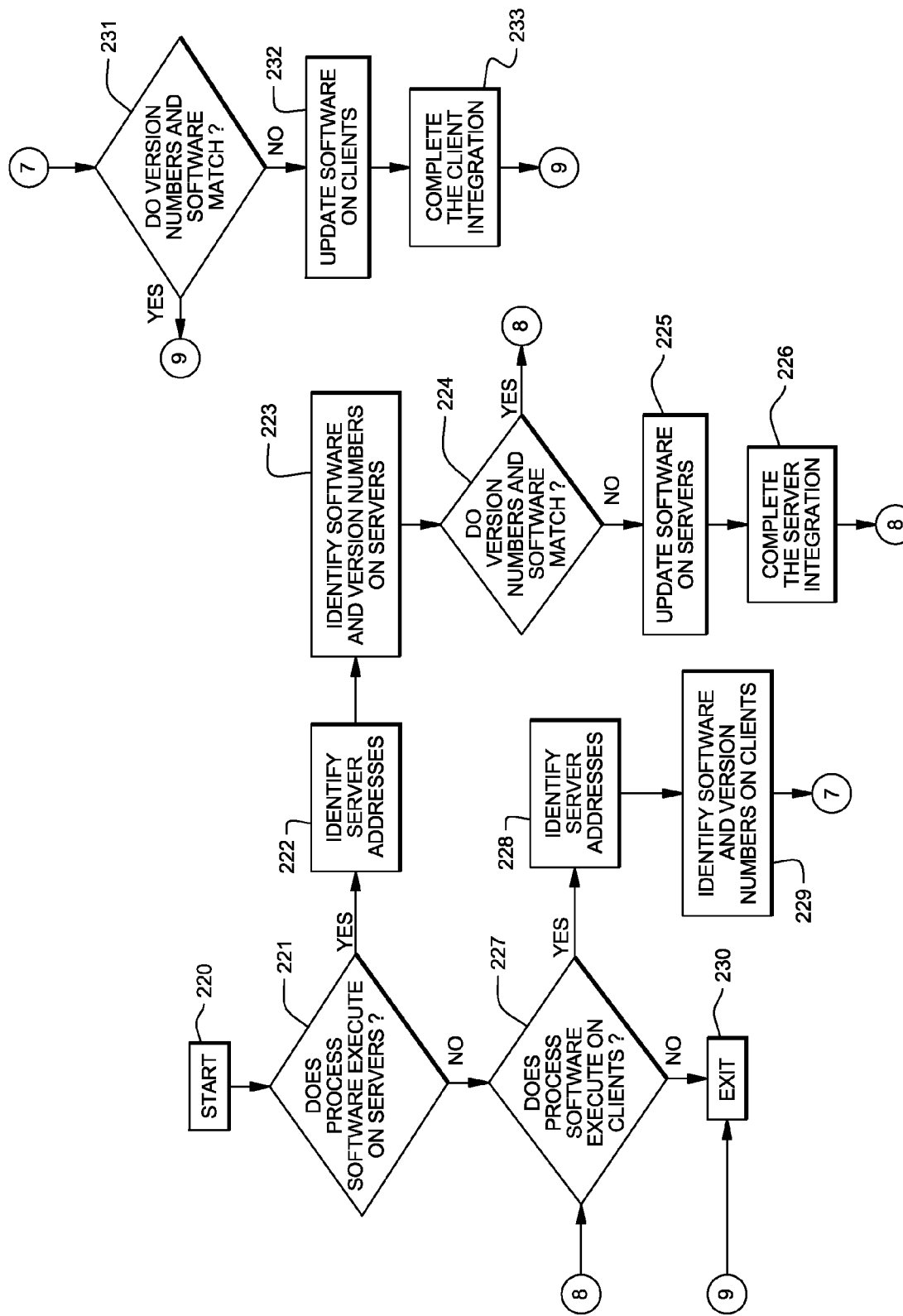
FIG. 7 is a flow diagram of methods for integration.

FIG. 7 refers to methods for integration. Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8:
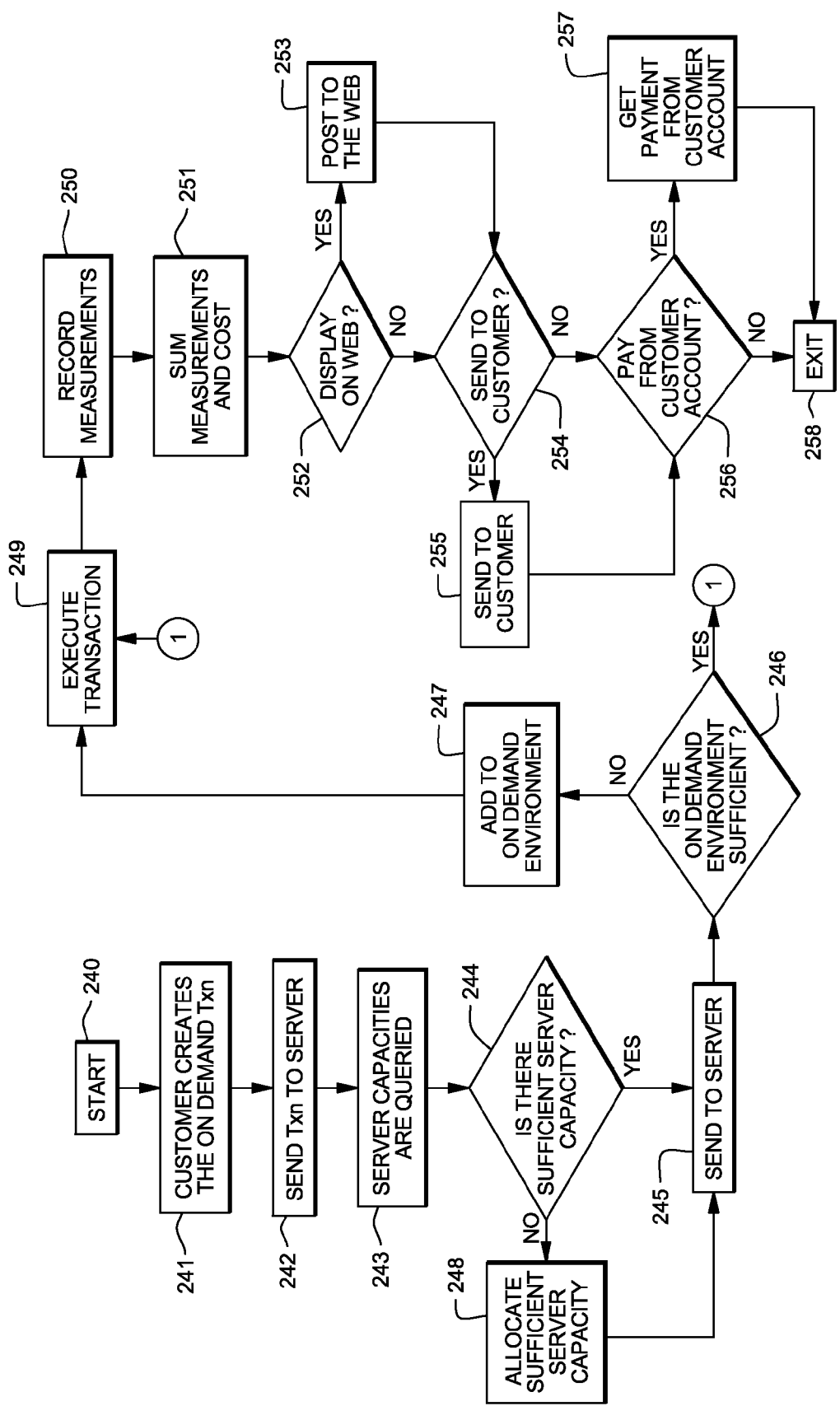
FIG. 8 is a flow diagram of methods for on-demand implementation.

FIG. 8 refers to methods for On Demand. Step 240 begins the On Demand process. A transaction is created than contains the unique customer identification, the requested service type and any service parameters that further specify the type of service 241. The transaction is then sent to the main server 242. In an On Demand environment, the main server can initially be the only server, then, as capacity is consumed, other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next, the required software to process the transaction is accessed, loaded into memory, then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254, then they are sent 255. If the customer has requested that the On Demand costs be paid directly from a customer account 256, then payment is received directly from the customer account 257. The last step is to exit the On Demand process.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 9:
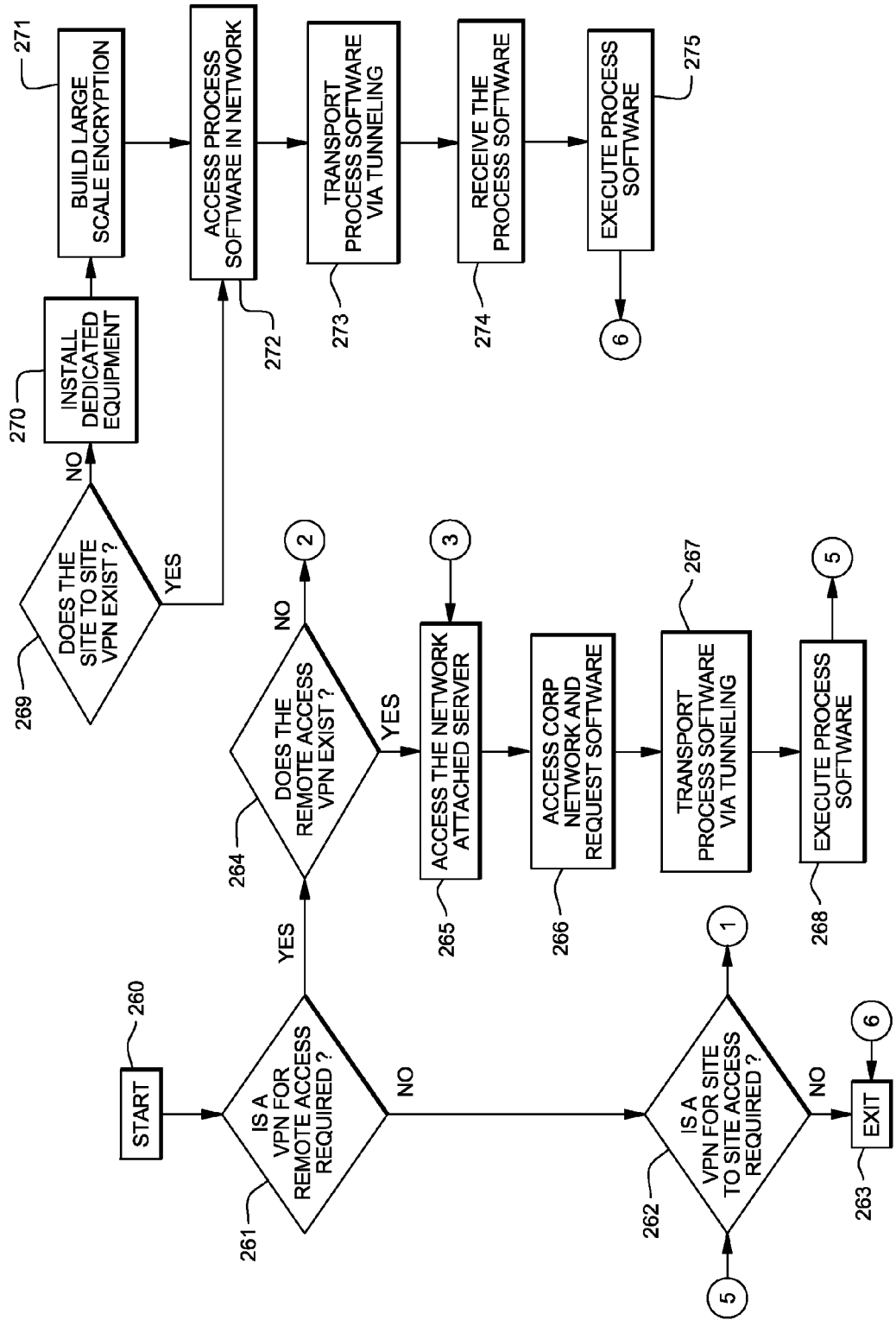
FIG. 9 is a flow diagram of methods for VPN Service.

FIG. 9 refers to systems and methods for VPN service. Step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise, identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling. The process software is divided into packets and each packet including the data and protocol is placed within another packet 274. When the process software arrives at the remote user's desktop, it is removed from the packets, reconstituted and is executed on the site users desktop 275. The process proceed to exit the process 263.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    identifying time sensitive processing sequences within a production environment using a computerized device, said processing sequences performing operations utilizing one or more tools;
    identifying non-committed work in process items that are grouped in non-committed lots for release into one or more of said time sensitive processing sequences, using said computerized device;
    sorting said non-committed lots by a predetermined priority, using said computerized device;
    starting with a highest priority non-committed lot and continuing, one lot at a time, with others of said non-committed lots in priority order until all said non-committed lots are evaluated, determining whether there is available tool capacity to process a non-committed lot through each corresponding time sensitive processing sequence to identify marked lots that are to be released into said one or more of said time sensitive processing sequences, said determining of whether there is available tool capacity comprising recalculating said available tool capacity based on which higher priority non-committed lots have been marked to be released into said time sensitive processing sequences, using said computerized device; and
    after said determining whether there is available tool capacity and all said non-committed lots are evaluated, releasing said marked lots to begin said corresponding time sensitive processing sequences, using said computerized device.

2. The method according to claim 1, further comprising, identifying committed remaining operations for said committed lots after releasing said non-committed lot to begin said corresponding time sensitive processing sequences.

3. The method according to claim 1, said releasing of said non-committed lot to begin said corresponding time sensitive processing sequences comprising a fully automated process that does not require human input.

4. The method according to claim 1, said releasing of said non-committed lot comprising a process that physically transforms said non-committed work in process items within said non-committed lots.

5. A method comprising:
    identifying time sensitive processing sequences within a production environment using a computerized device, said processing sequences performing operations utilizing one or more tools;
    identifying non-committed work in process items that are grouped in non-committed lots for release into one or more of said time sensitive processing sequences, using said computerized device;
    identifying committed work in process items that are being processed in committed lots within said time sensitive processing sequences, using said computerized device;
    identifying committed remaining operations for committed lots;
    identifying non-committed remaining operations for non-committed lots, using said computerized device;
    sorting said non-committed lots by a predetermined priority, using said computerized device;
    starting with a highest priority non-committed lot and continuing, one lot at a time, with others of said non-committed lots in priority order until all said non-committed lots are evaluated, determining whether there is available tool capacity to process a non-committed lot through each corresponding time sensitive processing sequence based on said committed remaining operations and said non-committed remaining operations to identify marked lots that are to be released into said one or more of said time sensitive processing sequences, said determining of whether there is available tool capacity comprising recalculating said available tool capacity based on which higher priority non-committed lots have been marked to be released into said time sensitive processing sequences, using said computerized device; and
after said determining whether there is available tool capacity and all said non-committed lots are evaluated, releasing said marked lots to begin said corresponding time sensitive processing sequences, using said computerized device.

6. The method according to claim 5, further comprising, repeating said identifying of said committed remaining operations for said committed lots after releasing said non-committed lot to begin said corresponding time sensitive processing sequences.

7. The method according to claim 5, said releasing of said non-committed lot to begin said corresponding time sensitive processing sequences comprising a fully automated process that does not require human input.

8. The method according to claim 5, said releasing of said non-committed lot comprising a process that physically transforms said non-committed work in process items within said non-committed lots.

9. A method comprising:
identifying time sensitive processing sequences within a production environment using a computerized device, said processing sequences performing operations utilizing one or more tools;
identifying non-committed work in process items that are grouped in non-committed lots for release into one or more of said time sensitive processing sequences, using said computerized device;
identifying committed work in process items that are being processed in committed lots within said time sensitive processing sequences, using said computerized device;
identifying committed remaining operations for committed lots;
identifying non-committed remaining operations for non-committed lots, using said computerized device;
identifying availability of said tools within said committed remaining operations, using said computerized device;
determining tools that will be utilized for said non-committed remaining operations, using said computerized device;
sorting said non-committed lots by a predetermined priority, using said computerized device;
starting with a highest priority non-committed lot and continuing, one lot at a time, with others of said non-committed lots in priority order until all said non-committed lots are evaluated, determining whether there is available tool capacity to process a non-committed lot through each corresponding time sensitive processing sequence based on said availability of said tools within said committed remaining operations and said tools that will be utilized for said non-committed remaining operations to identify marked lots that are to be released into said one or more of said time sensitive processing sequences, said determining of whether there is available tool capacity comprising recalculating said available tool capacity based on which higher priority non-committed lots have been marked to be released into said time sensitive processing sequences, using said computerized device; and
after said determining whether there is available tool capacity and all said non-committed lots are evaluated, releasing said marked lots to begin said corresponding time sensitive processing sequences, using said computerized device.

10. The method according to claim 9, further comprising, repeating said identifying of said committed remaining operations for said committed lots after releasing said non-committed lot to begin said corresponding time sensitive processing sequences.

11. The method according to claim 9, said releasing of said non-committed lot to begin said corresponding time sensitive processing sequences comprising a fully automated process that does not require human input.

12. The method according to claim 9, said releasing of said non-committed lot comprising a process that physically transforms said non-committed work in process items within said non-committed lots.

13. A computer program product comprising a computer readable non-transitory storage medium having computer readable program code embodied therewith, the computer readable program code being configured to perform a method comprising:
identifying time sensitive processing sequences within a production environment using a computerized device, said processing sequences performing operations utilizing one or more tools;
identifying non-committed work in process items that are grouped in non-committed lots for release into one or more of said time sensitive processing sequences, using said computerized device;
sorting said non-committed lots by a predetermined priority, using said computerized device;
starting with a highest priority non-committed lot and continuing, one lot at a time, with others of said non-committed lots in priority order until all said non-committed lots are evaluated, determining whether there is available tool capacity to process a non-committed lot through each corresponding time sensitive processing sequence to identify marked lots that are to be released into said one or more of said time sensitive processing sequences, said determining of whether there is available tool capacity comprising recalculating said available tool capacity based on which higher priority non-committed lots have been marked to be released into said time sensitive processing sequences, using said computerized device; and
after said determining whether there is available tool capacity and all said non-committed lots are evaluated, releasing said marked lots to begin said corresponding time sensitive processing sequences, using said computerized device.

14. The computer program product according to claim 13, said method further comprising, identifying committed remaining operations for said committed lots after releasing said non-committed lot to begin said corresponding time sensitive processing sequences.

15. The computer program product according to claim 13, said releasing of said non-committed lot to begin said corresponding time sensitive processing sequences comprising a fully automated process that does not require human input.

16. The computer program product according to claim 13, said releasing of said non-committed lot comprising a process that physically transforms said non-committed work in process items within said non-committed lots.

17. A system comprising:
resources and tools utilized to execute processing flows, said tools and resources transforming raw materials into intermediate and final products;
a dispatcher operatively connected to said resources and tool, said dispatcher directing said processing flows;

a fabrication flow controller operatively connected to said dispatcher; and a scheduler operatively connected to said dispatcher and said fabrication flow controller, said fabrication flow controller providing lot priorities to said schedulers and said dispatcher, said dispatcher identifying time sensitive processing sequences, said processing sequences performing operations utilizing said resources and tools;

said dispatcher identifying non-committed work in process items that are grouped in non-committed lots for release into one or more of said time sensitive processing sequences;

said dispatcher sorting said non-committed lots by a predetermined priority;

said dispatcher starting with a highest priority non-committed lot and continuing, one lot at a time, with others of said non-committed lots in priority order until all said non-committed lots are evaluated, determining whether there is available tool capacity to process a non-committed lot through each corresponding time sensitive processing sequence to identify marked lots that are to be released into said one or more of said time sensitive processing sequences, said determining of whether there is available tool capacity comprising recalculating said available tool capacity based on which higher priority non-committed lots have been marked to be released into said time sensitive processing sequences, after said determining whether there is available tool capacity and all said non-committed lots are evaluated, said dispatcher releasing said marked lots to begin said corresponding time sensitive processing sequences.

18. The system according to claim 17, said dispatcher identifying committed remaining operations for said committed lots after releasing said non-committed lot to begin said corresponding time sensitive processing sequences.

19. The system according to claim 17, said releasing of said non-committed lot to begin said corresponding time sensitive processing sequences comprising a fully automated process that does not require human input.

20. The system according to claim 17, said releasing of said non-committed lot comprising a process that physically transforms said non-committed work in process items within said non-committed lots.

* * * * *